March 25, 1930. J. B. MILLS ET AL 1,752,019
ODOMETER DRIVE
Filed June 28, 1926
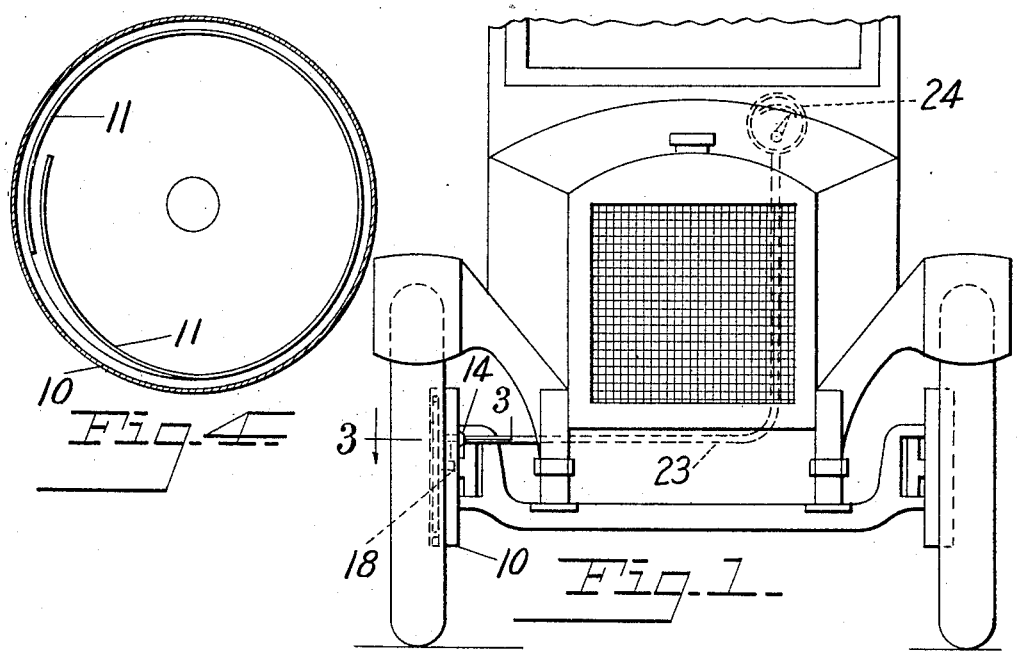
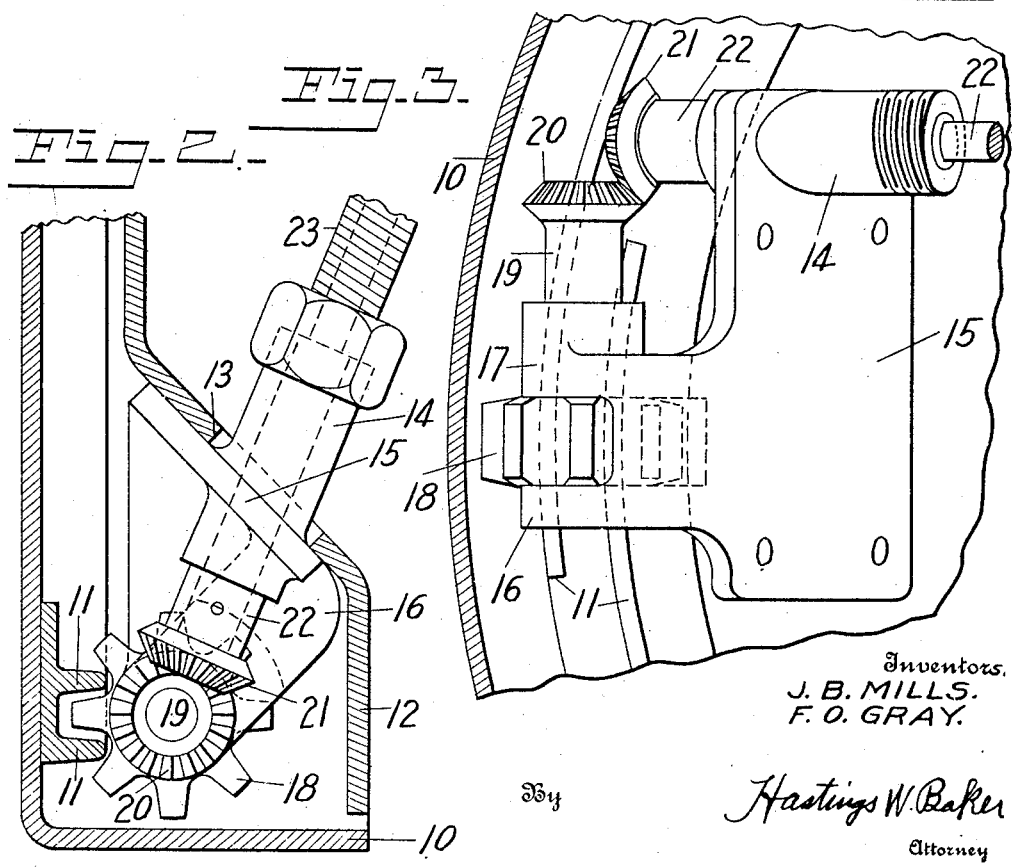
Inventors.
J. B. MILLS.
F. O. GRAY.
By Hastings W. Baker
Attorney Patented Mar. 25, 1930

1,752,019

UNITED STATES PATENT OFFICE

JOHN B. MILLS AND FREDERICK O. GRAY, OF DAYTON, OHIO, ASSIGNORS TO OHMER FARE REGISTER COMPANY, OF DAYTON, OHIO, A CORPORATION OF NEW YORK

ODOMETER DRIVE

Application filed June 28, 1926. Serial No. 118,957.

This invention relates to an improved driving means for odometers, speedometers, taximeters, and the like.

More specifically, the invention relates to an improved drive which may be employed in a car equipped with brakes on the front wheels as is common in cars which employ four-wheel brakes. Heretofore, it has been impossible to equip the front wheels with a drive connected to a driven instrument such as an odometer for the reason that the brake drum occupied the space which has heretofore been employed by the odometer driving means.

In the drawings, Figure 1 represents a front elevational view of an automobile having our improved drive incorporated thereon.

Figure 2 is a cross sectional plan view of the mechanism shown in Figure 3, certain parts being omitted for the sake of clearness.

Figure 3 is a cross sectional plan view on the line 3—3 of Figure 1, and

Figure 4 is an elevational view of the brake drum equipped with a spiral gear.

Referring more particularly to the drawings in which like reference characters are used throughout to designate corresponding parts.

The rotatable drum 10 has attached thereto a spiral gear 11 which is a one-toothed gear. The stationary disk 12 is provided with an opening 13 which receives a hollow shank 14 of a bracket 15. The bracket 15 is provided with a flange 16 projecting toward the face of the drum 10, which flange 16 carries a bearing 17 for a stub shaft 19 on which is mounted a spur pinion 18 which engages the gear 11 so as to be rotated one tooth each time the disk makes a complete revolution. The shaft 19 is provided at its opposite end with a beveled pinion 20 which engages a beveled pinion 21 on the shaft 22 rotatably mounted in the hollow shank 14. The shaft 22 is coupled by any conventional means to a flexible shaft 23 which would drive the driven instrument 24 which may be a speedometer, odometer, taximeter, or other instrument. The disk 12 is the conventional disk of the brake and is fixed to the car in such a manner that it does not rotate while the drum 10 is carried by one of the wheels of the car and rotates therewith.

In operation, when the car moves, the pinion 18 is rotated one tooth each time the wheel makes a complete revolution. As the pinion 18 is rotated, the shaft 19, beveled pinions 20 and 21, shaft 22, and flexible shaft 23 are likewise rotated, driving the driven instrument 24.

It is obvious that many changes can be made in the specific form shown herein by way of illustration without departing from the spirit of this invention. We therefore reserve for ourselves the right to make all changes which may fall within the scope of the appended claims.

Having now described our invention, we claim:

1. In a driving means a disk secured to a fixed part of an automobile, a bracket secured thereto, bearings extending at an angle to each other carried by said bracket, shafts mounted in said bearings, means operatably connecting said shafts, a brake drum, a spiral gear carried thereby, and means operatably connecting said gear to one of said shafts.

2. In a driving means a disk secured to a fixed part of an automobile, a bracket secured thereto and provided with bearings extending at an angle to each other, shafts mounted in said bearings, gearing means operatably connecting said shafts, a rotatable brake drum, a spiral gear carried thereby, a pinion carried by one of said shafts and in driving engagement with said gear, a driven instrument, and means operatably connecting the other of said shafts to said driven instrument.

In testimony whereof we affix our signatures.

JOHN B. MILLS.
FREDERICK O. GRAY.